Feb. 8, 1966 R. L. COLLINS 3,234,454
NUCLEAR MAGNETIC RESONANCE WELL LOGGING
Filed Sept. 4, 1962 2 Sheets-Sheet 1

INVENTOR.
R.L. COLLINS
BY Young & Quigg
ATTORNEYS

Feb. 8, 1966   R. L. COLLINS   3,234,454
NUCLEAR MAGNETIC RESONANCE WELL LOGGING
Filed Sept. 4, 1962   2 Sheets-Sheet 2

INVENTOR.
R.L. COLLINS
BY Young & Quigg
ATTORNEYS

United States Patent Office 3,234,454
Patented Feb. 8, 1966

3,234,454
NUCLEAR MAGNETIC RESONANCE
WELL LOGGING
Russell L. Collins, Bartlesville, Okla., assignor to Phillips
Petroleum Company, a corporation of Delaware
Filed Sept. 4, 1962, Ser. No. 221,051
3 Claims. (Cl. 324—.5)

This invention relates to the logging of wells by means of nuclear magnetic resonance measurements.

Valuable information can often be obtained concerning formations intersected by a well bore by means of nuclear magnetic resonance measurements. It is common practice to impress on materials in the formation a temporary magnetic field which is disposed at an angle to the magnetic field of the Earth. This results in the nuclei of the atoms with non-zero spin in any liquid present in the formation being aligned with the impressed magnetic field. The magnetic field is then removed rather abruptly which results in the nuclei of the atoms in the liquid precessing for a period of time. This precession dies out over a period of time which depends in part on the nature of the material in which the nuclei are found. The precession of the nuclei can be measured in terms of voltages introduced in a coil positioned in the bore hole adjacent the formation. Since the relaxation times differ for water and oil, this nuclear magnetic resonance measurement can be employed to distinguish between water and oil in formations surrounding the well bore. Corresponding nuclei in solids are also excited, but the relaxation time is shorter by several orders of magnitude and the signal decays before the signal from the liquids is measured.

It is often desirable to be able to measure the extent to which drilling fluids have invaded the various formations in order to determine relative porosities. This is accomplished in accordance with the present invention by nuclear magnetic resonance measurements. The well is first surveyed to determine zones which contain free fluids. A magnetic field is first applied to the formations and is then removed rather abruptly. The voltages induced in a detecting coil are observed to determine the presence of free fluids and the Larmor frequency of pression of the hydrogen nuclei of these fluids. Zones which contain free fluids are then surveyed in detail to determine the extent drilling fluids have penetrated the formations. Measurements are provided which are independent of the drilling fluid so as to provide indications of the depth of invasion of the drilling fluid. A magnetic field is again applied to the formations, but is removed rather slowly. An alternating magnetic field at the previously measured Larmor frequency is then applied to the formation for a short time. The resulting voltages induced in a detecting coil are once again measured. This procedure is repeated a number of times at the same depth using different amplitudes of alternating magnetic fields to provide a series of measurements. From the resulting data, the penetration of drilling fluids can readily be determined.

Accordingly, it is an object of this invention to provide a method of measuring the depths of penetration of drilling fluid into formations intersected by wells.

Another object is to provide an improved method of detecting the presence of fluids in formations intersected by wells.

Another object is to provide improved apparatus for use in detecting materials by means of nuclear magnetic resonance measurements.

A further object is to provide novel apparatus for use in logging wells by nuclear magnetic resonance measurements.

Other objects, advantages and features of the invention should become apparent from the following detailed description, taken in conjunction with the accompanying drawing in which.

Figure 1:
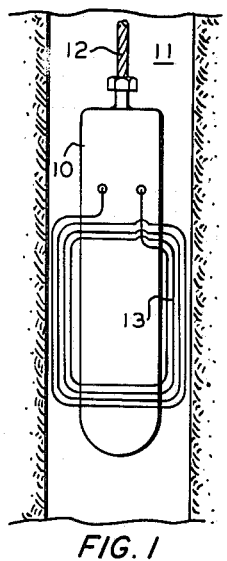
FIGURE 1 is a schematic representation of nuclear magnetic resonace well logging equipment.

Referring now to the drawing in detail and to FIGURE 1 in particular, there is shown a housing 10 which is adapted to be lowered into a well bore 11 by means of a cable 12. Housing 10 is formed of a non-magnetic material such as brass. A coil 13 is carried by housing 10 so that the passage of current through the coil results in a magnetic field being established in the surrounding formation at an angle to the magnetic field of the Earth. It is preferred that coil 13 be positioned so that the magnetic field established thereby is generally perpendicular to the magnetic field of the Earth. Coil 13 is illustrated schematically in FIGURE 1. However, this coil can be positioned against the well bore wall by apparatus such as is described in U.S. Patent 2,838,732. Cable 12 contains a plurality of electrical leads, not shown, which extend from housing 10 to the surface of the Earth. A part of the electrical equipment, described hereinafter, which is connected to coil 13 is normally contained within housing 10.

Figure 2:
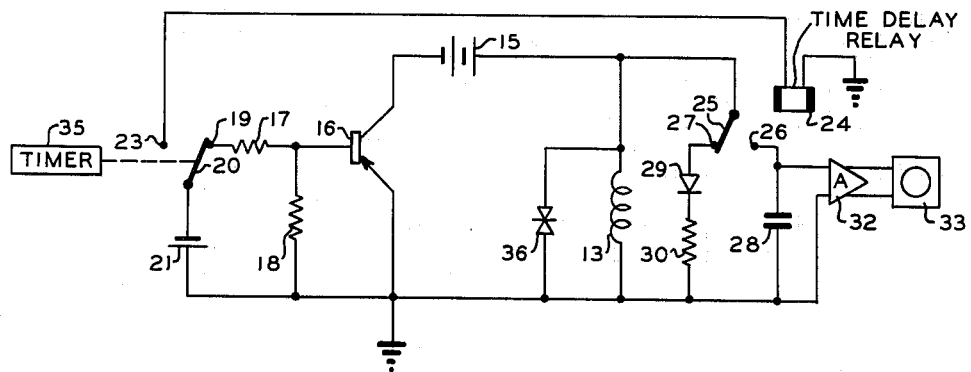
FIGURE 2 is a schematic drawing of a first embodiment of the electrical circuit associated with the apparatus of FIGURE 1.

As illustrated in FIGURE 2, one terminal of coil 13 is connected to the positive terminal of a voltage source 15. The second terminal of coil 13 is connected to ground. The negative terminal of voltage source 15 is connected to the collector of a transistor 16. The emitter of transistor 16 is connected to ground. The base of transistor 16 is connected through resistors 17 and 18 to a terminal 19 and to ground, respectively. Terminal 19 is adapted to be engaged by a switch 20 which is connected to the negative terminal of a second voltage source 21. The positive terminal of voltage source 21 is connected to ground. When switch 20 engages terminal 19, conduction takes place through transistor 16 such that current flows from voltage source 15 through coil 13. This establishes the magnetic field in the formations adjacent housing 10.

Switch 20 is also adapted to engage a second terminal 23 which is connected to the first terminal of a coil 24 of a time delay relay. The second terminal of coil 24 is connected to ground. When relay coil 24 is energized by switch 20 being moved into engagement with terminal 23, switch 25 engages a terminal 26. In the absence of the relay coil being energized, switch 25 engages a terminal 27. Switch 25 is connected to the positive terminal of voltage source 15. A capacitor 28 is connected between terminal 26 and ground. A Zener diode 29 and a resistor 30 are connected in series relationship with one another between terminal 27 and ground. The input terminals of an amplifier 32 are connected across capacitor 28. The output terminals of amplifier 32 are connected to a meter 33, such as an oscilloscope.

In accordance with this invention, only those liquids in formations beyond the drilling fluid which occupies the well are measured. The signals which normally would be established by hydrogen nuclei in the drilling fluid are eliminated by positioning soluble paramagnetic material in the drilling fluid. The presence of sufficient material can readily be tested by placing the apparatus of FIGURE 1 in a sample of the drilling fluid, such as in the mud pit. When no signal is obtained, by the procedure described hereinafter, it is known that enough magnetic material is present in the drilling fluid.

Figure 3:
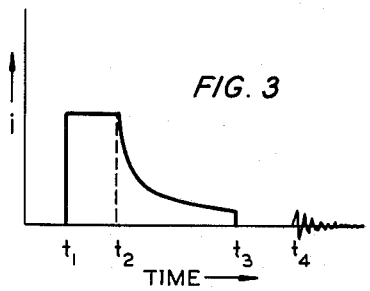
FIGURE 3 is a graphical representation of the operation of the circuit of FIGURE 2.

The first step in the method of this invention is to position the apparatus of FIGURE 2 in the well and make readings at each depth of interest. At each such depth, switch 20 is first moved into engagement with terminal 19 so that current is applied to coil 13. This establishes a magnetic field in the formation. FIGURE 3 is a graphical representation of the flow of current through coil 13 as a function of time. The movement of switch 20 into engagement with terminal 19 occurs at time $t_1$. After the magnetic field has been established, switch 30 is moved into engagement with terminal 23 at time $t_2$. This extinguishes current flow through transistor 16 so that current is no longer supplied to coil 13 from voltage source 15. At the same time, relay coil 24 is energized. However, this relay has a time delay, which can be of the order of milliseconds, for example, which delays the movement of switch 25 into engagement with terminal 26. The voltage applied across Zener diode 29 at this time is sufficient to break down the diode such that current flows through resistor 30 to ground to dissipate the current induced in coil 13. The time constant $L/R$ is relatively large due to the small resistance of resistor 30. Of course, this time constant can be varied by changing the value of resistor 30. The decay of current through coil 13 is shown in FIGURE 3 between times $t_2$ and $t_3$. At time $t_3$, the voltage across the Zener diode is reduced to such a value that the diode is no longer broken down. This reuslts in the rapid decay of the remainder of the current, as shown in FIGURE 3, because the time constant approaches zero. Thereafter, relay coil 24 moves switch 25 into engagement with terminal 26. This connects capacitor 28 in parallel with coil 13.

At a later time $t_4$, a current is induced in coil 13 due to precession of nuclei in the formation adjacent coil 13. This results in damped oscillations being set up in the circuit of coil 13 and capacitor 28. These oscillations are amplified and applied to oscilloscope 33.

A double diode 36 is connected in parallel with coil 13. This double diode permits conduction to take place when the voltage applied thereacross exceeds a preselected value. The purpose of this double diode is to prevent current surges from flowing through transistor 16.

In one specific embodiment, the following circuit components are employed:

| Element: | Value |
| --- | --- |
| 15 | 12 volts. |
| 21 | 3 volts. |
| 13 | 6 millihenries, 2 ohms. |
| 30 | 48 ohms. |
| 17 | 33 ohms. |
| 18 | 130 ohms. |
| 28 | 1.0 microfarad. |
| 16 | TI 2N1022. |
| 36 | Conducts when applied voltage exceeds 44 volts. |

The number of components of FIGURE 2 that are contained in housing 10 for logging operations can be varied, as desired. In many operations, all of the components except oscilloscope 30 are contained in the housing. However, by the use of a camera, even oscilloscope 30 can be in housing 10.

The sequence of events thus far described is repeated periodically at different depths of the well. To this end, switch 26 is moved back and forth between terminals 19 and 23 by means of a timer 35. This timer can be a motor driven cam, for example, which performs the desired switching operation. As the result of this survey, a plurality of signals are obtained of damped oscillations, as shown after time $t_4$ in FIGURE 3. These oscillations are obtained only at those regions which contain free fluids. The frequencies of these oscillations represent the Larmor frequencies for the magnetic field of the Earth at the corresponding locations.

The next step is to investigate in detail regions which contain free fluids, as determined by the above procedure. The apparatus illustrated in FIGURE 4 can be employed for this purpose. This apparatus is quite similar to that illustrated in FIGURE 2 and corresponding elements are designated by like primed reference numerals. An additional switch 40 is associated with relay coil 24'. This switch engages respective terminal 42 when the relay coil is energized. Terminal 42 and a switch 41 are connected to coil 13'. Switch 41, which is actuated by a timer 49, is connected to amplifier 32' and capacitor 28'. An oscillator 45 is provided, the frequency of which can be adjusted to be equal to the Larmor frequencies measured by the procedure previously described. The output signal from oscillator 45 is applied through an amplifier 46 and a gate circuit 47 to switch 40. The position of switch 20' is regulated by timer 49, which also adjusts the gain of amplifier 46 and controls gate circuit 47. The operation of timer 49 to perform these functions is described in detail hereinafter.

Figure 4:
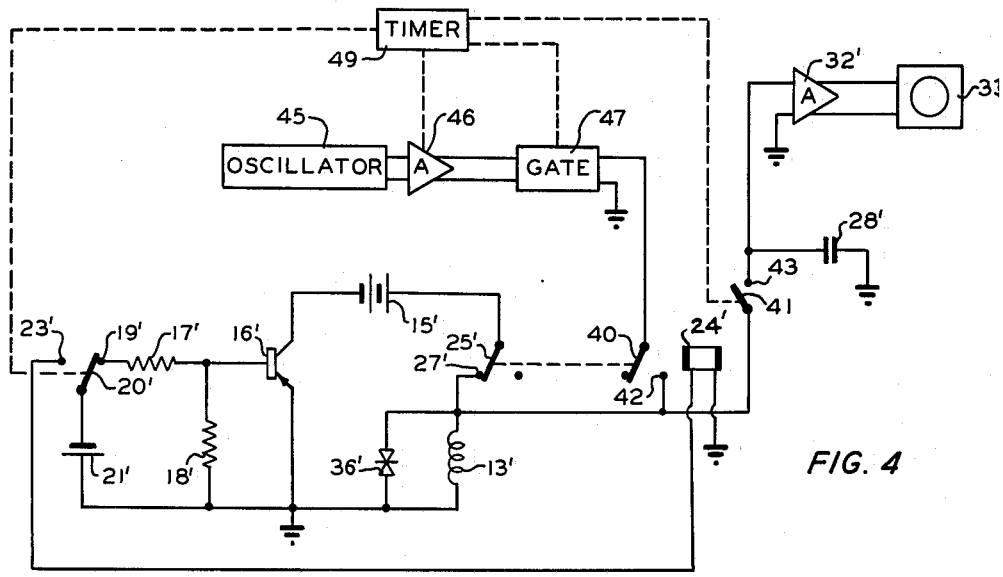
FIGURE 4 is a schematic drawing of a second embodiment of the electrical circuit associated with the apparatus of FIGURE 1.

At each location to be investigated, a plurality of measurements are made with the apparatus of FIGURE 4. Oscillator 45 is set at the Larmor frequency for the formation at the particular location. Timer 49 first moves switch 20' into engagement with terminal 19' to apply a direct current to coil 13', in the manner previously described. At a time corresponding to $t_2$ of FIGURE 3, timer 49 moves switch 20' into engagement with terminal 23'. This energizes relay coil 24' to remove current source 15' from coil 13' and to connect the output of oscillator 45 across coil 13'. However, gate circuit 47 is closed at this time to prevent the signal from oscillator 45 from being applied to coil 13'. The current through coil 13' decays in the general manner shown in FIGURE 3 between times $t_2$ and $t_3$. Since Zener diode 29 of FIGURE 2 is not employed, the current continues to decay exponentially after time $t_3$, rather than abruptly. This is known as "adiabatic" decay as used in the Ehrenfest concept of adiabatische-reversible phenomena. After time $t_3$, timer 49 opens gate circuit 47 to apply a pulse of alternating current to coil 13'. The time duration of this pulse can be of the order of 1 to 20 milliseconds, for example. Immediately thereafter, timer 49 closes switch 41 to connect coil 13' to oscilloscope 33' through amplifier 32'. This procedure is thereafter repeated a number of times at each location except that timer 49 changes the gain of amplifier 46 each time to vary the amplitude of the pulse applied to coil 13'.

Figure 5:
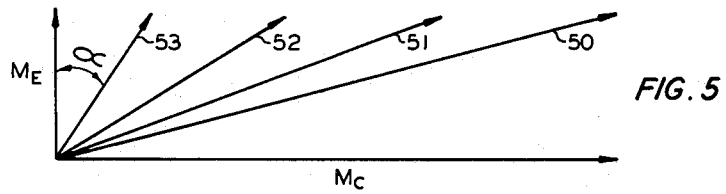
FIGURE 5 is a schematic representation of magnetic moments of protons under the influence of a magnetic field.

FIGURE 5 illustrates schematically the effect of the procedure of this invention on protons in the surrounding formations. The vertical arrow $M_E$ represents the magnetic moment established by the field of the Earth. The horizontal arrow $M_c$ represents the magnetic moment established by the field of coil 13' when direct current is passed therethrough. When this latter field decays, the resultant magnetic moment decays progressively as shown by arrows 50, 51, 52 and 53. The angles these resultant moments make with $M_E$ are designated $\alpha$. The magnitude of $\alpha$ is determined by the relationship:

$$\alpha = \gamma H \tau$$

where $\gamma$ is a constant equal to 4,257 cycles/second/gauss, H is the strength of the applied alternating magnetic field in gausses, and $\tau$ is the time in seconds the alternating current is applied to coil 13' from oscillator 45. Since the field H decreases at progressively greater distances into the formations, $\alpha$ will likewise decrease.

Figure 6:
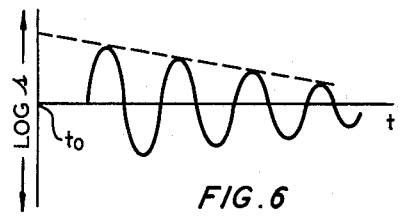
FIGURE 6 is a schematic representation of the type of signal observed by the practice of this invention.
Figure 7:
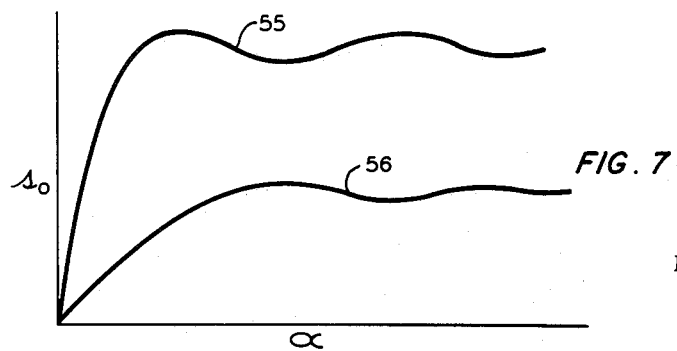
FIGURE 7 shows the types of curves which are plotted from the information obtained by curves of the type shown in FIGURE 6 to determine depth of fluid invasion.

The magnitude of the voltages induced in coil 13′ by precession of protons about the resultant magnetic moments is proportional to the sine of $\alpha$. As previously mentioned, alternating signals of different amplitudes are applied to coil 13′ from oscillator 45 for the sequential measurements. Since the voltages subsequently induced in coil 13′ from precession of the protons decay in approximately an exponential manner, it is desirable to employ an amplifier 32′ which has a logarithmic response so that the decay is generally linear. This facilitates the interpretation, as discussed hereinafter, but is not necessary. When such an amplifier is employed, the signals observed on oscilloscope 33′ are of the configuration illustrated in FIGURE 6. These signals constitute a plot of the logarithm of the signal amplitude as a function of time. By extrapolation, as shown by the dotted line, the value of the logarithm of the signal at time $t_0$ can be obtained. The quantity $t_0$ represents the time at which the field applied to coil 13′ is collapsed. This procedure thus provides a number of values of signals $s_0$ at times $t_0$, which can readily be obtained from the corresponding logarithms, for different strengths of applied field. These values of $s_0$ are then plotted as functions of $\alpha$ to obtain curves such as 55 and 56 of FIGURE 7. The curve 55, which initially rises abruptly with increasing $\alpha$, represents a small invasion of drilling fluid into the formation. Curve 56, on the other hand, represents deeper invasion. A comparison of the shapes of the various curves produced thus provides an indication of the depth of fluid invasion at different locations in the well.

While this invention has been described in conjunction with a presently preferred embodiment, it should be evident that it is not limited thereto.

What is claimed is:

1. The method of well logging which comprises: (1) measuring the Larmor frequency of precession of liquid in a section of the Earth surrounding a well bore, (2) establishing a unidirectional magnetic field in said section, (3) permitting said magnetic field to decay adiabatically, (4) applying a second magnetic field to said section for a preselected time interval, said second magnetic field alternating in direction at said Larmor frequency, (5) measuring the precession of liquid in said section after said second magnetic field is removed, and (6) thereafter repeating steps (2), (3), (4) and (5) in the same section of the Earth except that the amplitude of the second magnetic field is different from the value first employed.

2. The method of claim 1 wherein the Larmor frequency of precession of liquids in said section is measured by establishing a unidirectional magnetic field in the section, permitting the magnetic field to decay, and measuring the precession of liquid in the section after the decay of the magnetic field, the frequency of such precession being said Larmor frequency.

3. The method of logging a well which comprises: (1) adding a paramagnetic material to the fluid in the well to be logged, (2) positioning a coil in the well at a selected depth, (3) passing a direct current through the coil for a preselected time, (4) thereafter connecting a capacitor in parallel with the coil and measuring signals induced in the coil, the frequency of which is representative of the Larmor frequency of precession of liquid in the Earth adjacent said well at said selected depth, (5) positioning a coil in the well at said selected depth, (6) passing a direct current through said last-mentioned coil for a preselected time and thereafter permitting the magnetic field set up by such direct current to decay adiabatically, (7) thereafter passing an alternating current through said last-mentioned coil for a preselected time, the frequency of said alternating current being said Larmor frequency, (8) thereafter connecting a capacitor in parallel with said last-mentioned coil and measuring signals induced in the coil, and (9) thereafter repeating steps (6), (7) and (8) at the same depth of the well except that the amplitude of the alternating current is different from the value first employed.

References Cited by the Examiner

UNITED STATES PATENTS

| | | | |
|---|---|---|---|
| Re. 23,769 | 1/1954 | Varian | 324—0.5 |
| 2,878,443 | 3/1959 | Schuster | 324—0.5 |
| 2,968,761 | 1/1961 | Zimmerman et al. | 324—0.5 |
| 3,025,457 | 3/1962 | Bloom | 324—0.5 |
| 3,066,252 | 11/1962 | Drake et al. | 324—0.5 |
| 3,096,476 | 7/1963 | Poindexter et al. | 324—0.5 |
| 3,135,912 | 6/1964 | Baker et al. | 324—0.5 |

FOREIGN PATENTS

| | | |
|---|---|---|
| 1,280,906 | 11/1961 | France. |
| 745,873 | 3/1956 | Great Britain. |

OTHER REFERENCES

Powles et al.: Nature—vol. 180, No. 4598, Dec. 14, 1957, pages 1344 and 1345, (Q–1–N2).

Powles et al.: Archives des Sciences, vol. 11, 7th Colloque ampere edition, July 1958, pp. 209–214. incl., (QC–770.C6).

CHESTER L. JUSTUS, *Primary Examiner.*

MAYNARD R. WILBUR, *Examiner.*